(12) United States Patent
Martin

(10) Patent No.: US 10,578,204 B2
(45) Date of Patent: Mar. 3, 2020

(54) FUSED PILOT FOR BOSS-MOUNTED GEARBOX LINK

(71) Applicant: United Technologies Corporation, Farmington, CT (US)

(72) Inventor: Octavio Martin, Broad Brook, CT (US)

(73) Assignee: United Technologies Corporation, Farmington, CT (US)

( * ) Notice: Subject to any disclaimer, the term of this patent is extended or adjusted under 35 U.S.C. 154(b) by 701 days.

(21) Appl. No.: 15/244,088

(22) Filed: Aug. 23, 2016

(65) Prior Publication Data

US 2018/0058568 A1  Mar. 1, 2018

(51) Int. Cl.
| | | |
|---|---|---|
| F16H 57/025 | (2012.01) | |
| F01D 25/28 | (2006.01) | |
| F16H 57/032 | (2012.01) | |
| F02C 7/32 | (2006.01) | |

(52) U.S. Cl.
CPC .......... *F16H 57/025* (2013.01); *F01D 25/28* (2013.01); *F02C 7/32* (2013.01); *F16H 57/032* (2013.01); *F05D 2220/323* (2013.01); *F05D 2260/30* (2013.01); *F05D 2260/311* (2013.01); *Y02T 50/671* (2013.01)

(58) Field of Classification Search
CPC .......... F16H 57/025; F02C 7/32; F01D 25/28; F05D 2260/311; F05D 2260/30
See application file for complete search history.

(56) References Cited

U.S. PATENT DOCUMENTS

| | | | |
|---|---|---|---|
| 2,783,003 A | 2/1957 | Ralston | |
| 2,887,011 A | 5/1959 | Harvey | |
| 3,405,891 A | 10/1968 | Jacquart | |
| 4,155,522 A | 5/1979 | Sealey | |
| 4,166,878 A * | 9/1979 | Thompson | F02C 7/24 428/68 |
| 4,695,220 A | 9/1987 | Dawson | |
| 5,168,447 A | 12/1992 | Moore | |
| 6,334,588 B1 | 1/2002 | Porte | |
| 6,357,220 B1 | 3/2002 | Snyder et al. | |
| 7,093,996 B2 | 8/2006 | Wallace | |
| 8,061,969 B2 | 11/2011 | Durocher | |

(Continued)

FOREIGN PATENT DOCUMENTS

WO  WO-2014081500 A2 *  5/2014  .......... F01D 21/045

OTHER PUBLICATIONS

Nikita Khlystov, Uniaxial Tension and Compression Testing of Materials, Sep. 25, 2013, Massachusetts Institute of Technology, p. 3-5 (Year: 2013).*

(Continued)

*Primary Examiner* — Scott J Walthour
*Assistant Examiner* — Colin J Paulauskas
(74) *Attorney, Agent, or Firm* — Getz Balich LLC

(57) ABSTRACT

Aspects of the disclosure are directed to a system associated with an aircraft engine, comprising: a gearbox, a link coupled to the gearbox, and a bracket coupled to the link, where the bracket includes at least one notch formed in the bracket to provide a pilot for a fuse trigger, and where a portion of the bracket contained within the at least one notch breaks away from the bracket when the system experiences a load that is less than a nominal load associated with a fan blade out event of the aircraft engine.

17 Claims, 4 Drawing Sheets

(56) References Cited

U.S. PATENT DOCUMENTS

| | | |
|---|---|---|
| 8,245,518 B2 | 8/2012 | Durocher |
| 8,347,635 B2 | 1/2013 | Durocher |
| 9,016,068 B2 | 4/2015 | Martin |
| 2009/0162139 A1* | 6/2009 | Miller .................. F01D 25/243 403/296 |
| 2013/0042630 A1 | 2/2013 | Muldoon |
| 2013/0320134 A1* | 12/2013 | Bell ....................... B64D 41/00 244/54 |
| 2014/0314546 A1 | 10/2014 | Davis et al. |
| 2016/0177840 A1* | 6/2016 | Robertson ............ F01D 21/045 60/796 |
| 2017/0335896 A1 | 11/2017 | Altamura |

OTHER PUBLICATIONS

EP search report for EP17187570.1 dated Jan. 25, 2018.

\* cited by examiner

US 10,578,204 B2

FUSED PILOT FOR BOSS-MOUNTED GEARBOX LINK

BACKGROUND

As part of an aircraft engine design, gearboxes are subjected to competing criteria. For example, on one hand it may be desirable to use light-weight materials as part of the gearbox hardware in order to reduce aircraft weight. On the other hand, the gearbox materials must be sufficiently strong/durable in order to withstand various loads. Fan blade out (FBO) loads are often the limiting factor as part of a conventional gearbox design. FBO loads are the imbalance loads that the gearbox may experience based on a fan blade becoming detached from a fan hub/rotor.

As part of more modern gearbox designs, fuses are incorporated in an effort to avoid over-designing the gearbox hardware (e.g., in order to avoid adding excessive weight to the gearbox to protect against a rare FBO event). Such fuses are designed in pins or bolts with a small, tight tolerance notch added to a pin to provide a break point. The challenge in the use of such a fuse is that the fuse has to be able to withstand icing loads without being triggered/tripped. Often, machining tolerances on the notch limit the effectiveness of the fuse.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an aircraft engine, comprising: a gearbox, a link coupled to the gearbox, and a bracket coupled to the link, where the bracket includes at least one notch formed in the bracket to provide a pilot for a fuse trigger, and where a portion of the bracket contained within the at least one notch breaks away from the bracket when the system experiences a load that is less than a nominal load associated with a fan blade out event of the aircraft engine. In some embodiments, the load corresponds to 75% of the nominal load. In some embodiments, the system further comprises a bolt and a nut that couple the bracket to the link. In some embodiments, the system further comprises a plate coupled to the bracket that is configured to center a tube. In some embodiments, the gearbox is made of at least aluminum. In some embodiments, the link is made of at least steel. In some embodiments, the bracket is made of at least one of nickel or steel. In some embodiments, the system further comprises a stationary structure coupled to the bracket. In some embodiments, the stationary structure is made of at least nickel. In some embodiments, the stationary structure is one of a mid-turbine frame or an engine case. In some embodiments, the bracket includes a first hole configured to seat a first bolt and a second hole configured to seat a second bolt. In some embodiments, the system further comprises the first bolt and the second bolt. In some embodiments, at least one of the first bolt or the second bolt is made of at least one of a nickel alloy, steel, or cobalt. In some embodiments, at least one of the gearbox, the link, and a second portion of the bracket that is outside of the notch includes material to withstand a second load that is less than the nominal load. In some embodiments, a size of the at least one notch is based on a minimum cross sectional area of the bracket at a location coinciding with the at least one notch and the load. In some embodiments, the size of the at least one notch is proportional to the minimum cross sectional area divided by the load.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
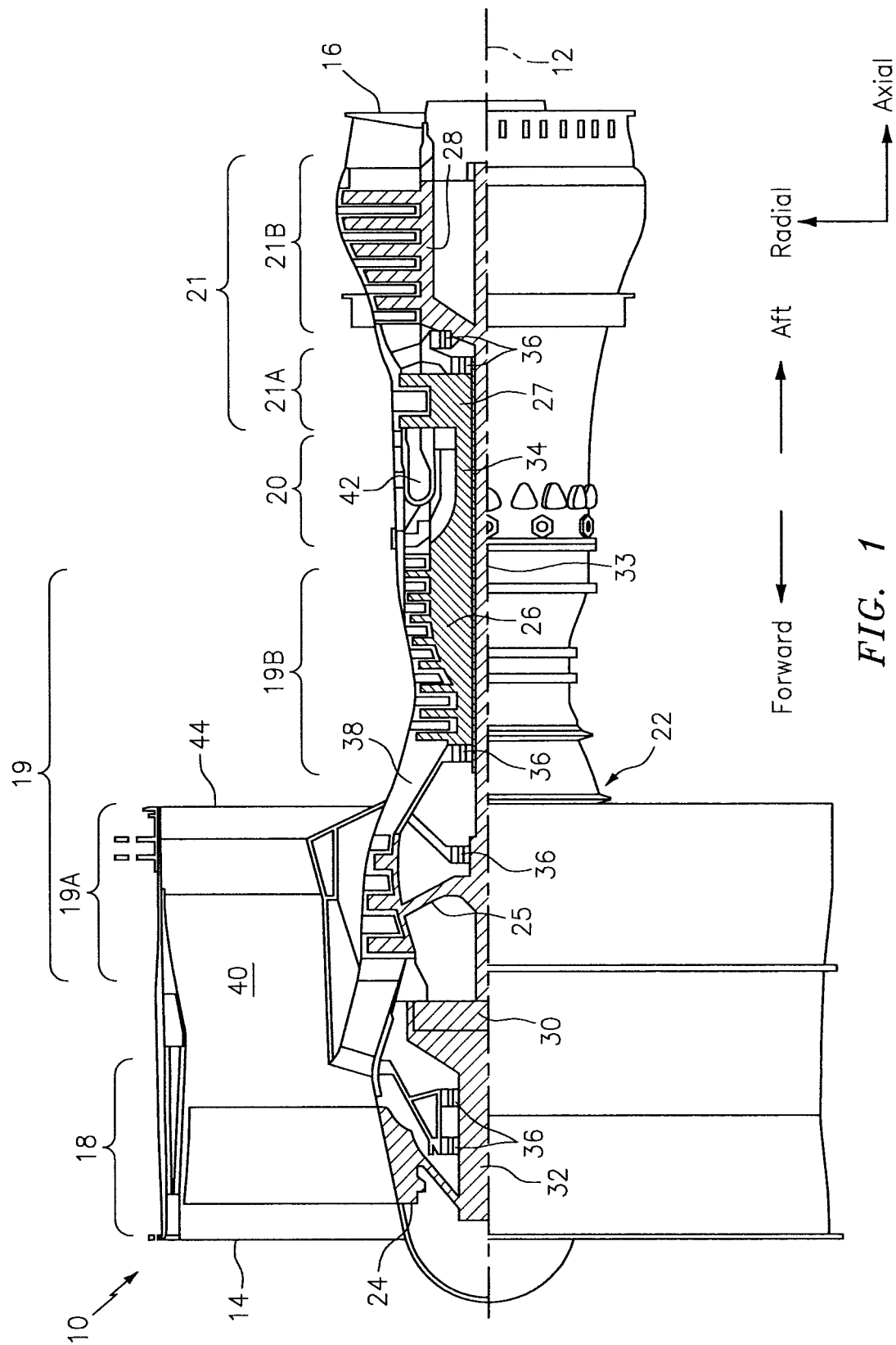
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure are directed to a fuse incorporated in hardware associated with a gearbox. As used herein, a fuse refers to a sacrificial material that disengages at a threshold associated with a load. In some embodiments, the fuse may correspond to a notch formed in a bracket. The use of the fuse may protect against unexpected, event-driven load increases, e.g., an engine may be safely shut down despite experiencing such load. The use of the fuse may allow the gearbox to be designed/manufactured with lighter-weight materials (relative to conventional designs) by allowing the gearbox to be designed/manufactured against the fuse load, as opposed to the event load.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2:
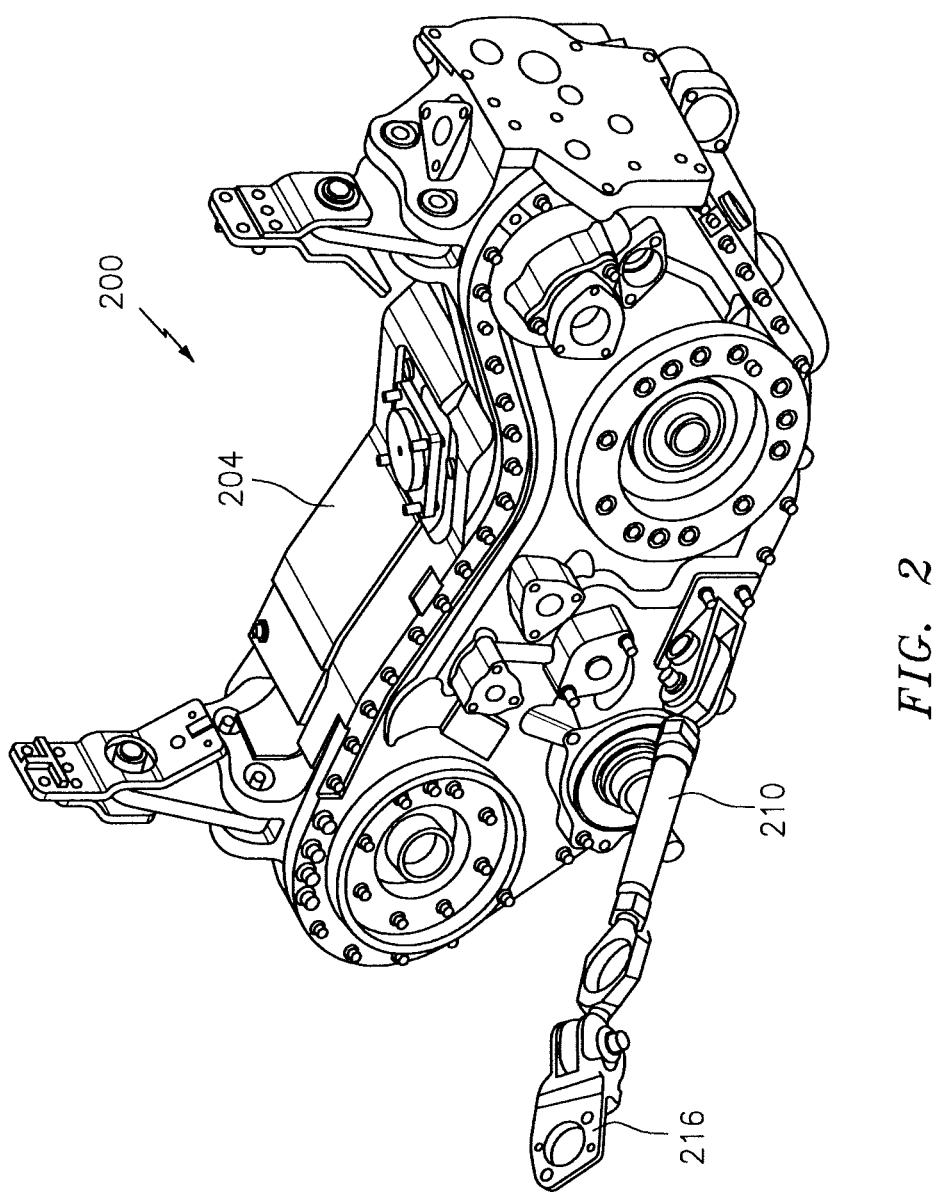
FIG. 2 illustrates a system incorporating a gearbox and a link in accordance with aspects of this disclosure.

Referring now to FIG. 2, a system 200 is shown. The system 200 may be incorporated as part of an engine, such as for example the engine 10 of FIG. 1. The system 200 includes a gearbox 204. The gearbox 204 may be made of one or more materials, such as aluminum. The gearbox 204 may be used for a variety of purposes, such as for example reducing the rotational speed of an engine to enable connection of low-speed systems (e.g., electric generators, hydraulic pumps, etc.).

The gearbox 204 may be coupled to a link 210. The link 210 may be made of one or more materials. For example, the link 210 may be made of steel. The link 210 may be used to prevent or otherwise limit the degree to which the gearbox 204 may rock/move during engine operation.

A first end of the link 210 may terminate at the gearbox 204 and a second end of the link 210 may terminate at a bracket 216. The bracket 216 may be made of one or more materials, such as for example nickel, steel, etc.

Figure 3:
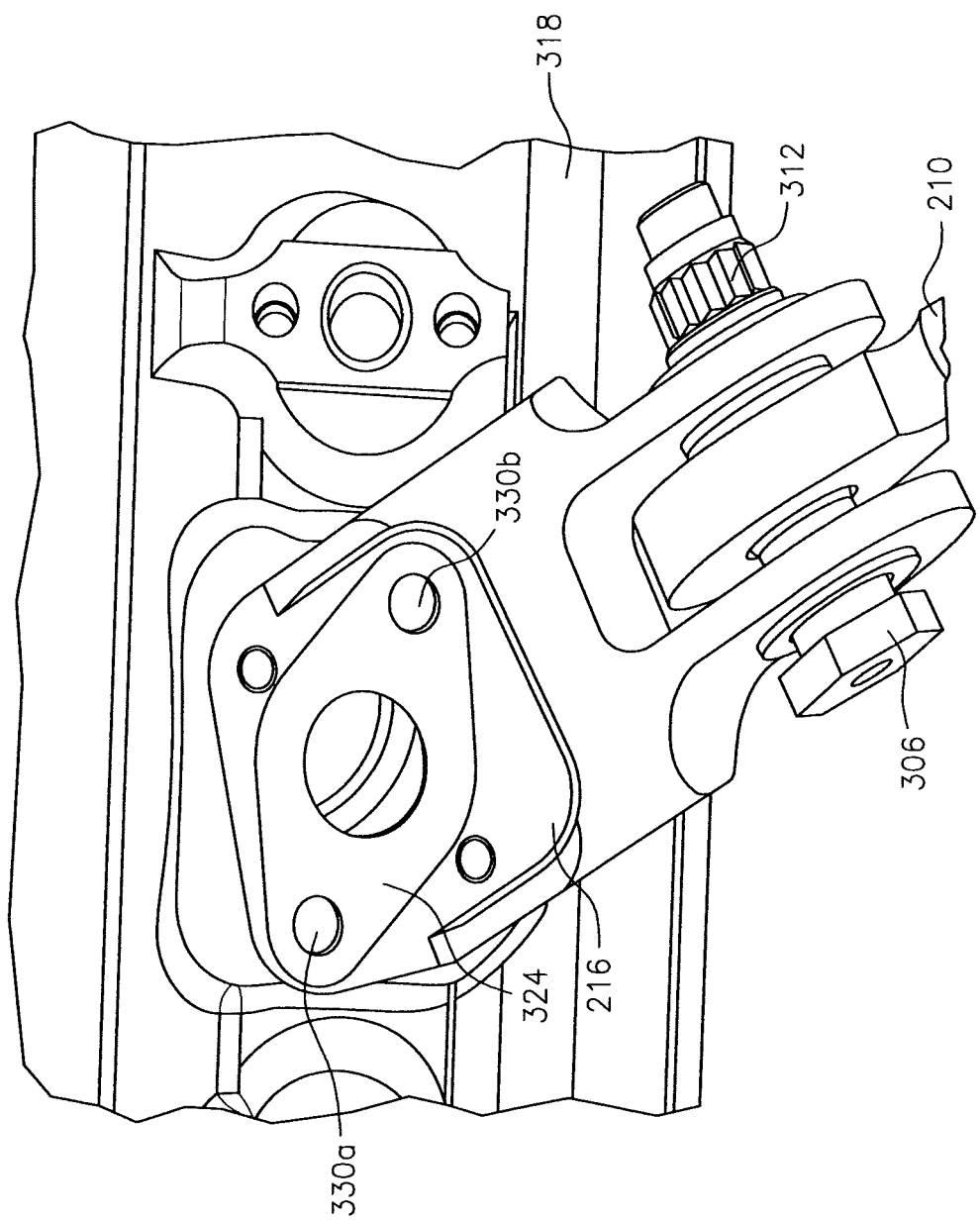
FIG. 3 illustrates a portion of the link of FIG. 2 including a bracket.

Referring to FIG. 3, the bracket 216 may be coupled to the link 210 via one or more techniques. For example, a bolt 306 and a nut 312 may be used to couple the link 210 and the bracket 216. The bracket 216 may mount to a structure 318, e.g., a stationary structure. The structure 318 may include a mid-turbine frame (MTF), an engine case, etc. The structure 318 may be made of one or more materials, e.g., nickel.

The bracket 216 may be coupled to (e.g., may seat/accommodate) a plate 324. The plate 324 may be used to center a tube (not shown) that may convey, e.g., one or more fluids or electrical signals.

As shown in FIG. 3, one or more holes (e.g., holes 330 a and 330 b) may be formed in the plate 324 and the bracket 216 in order to mount the plate 324 and the bracket 216 to the structure 318. Such mounting may be facilitated by the use of a bolt (e.g., bolt 430 a or bolt 430 b) seated in a respective hole 330 a/330 b (see FIGS. 3-4). The bolts 430 a/430 b may be made of one or more materials, such as for example nickel alloy, cobalt, steel, etc. A mounting surface 450 of the bracket 216 may be mounted to the structure 318 with a tight fit to ensure all operational and FBO loads are transmitted through the bracket 216. The mounting surface 450 of the bracket 216 may be mounted within a corresponding aperture 452 of the structure 318. The bolts 430 a/430 b may be installed with a looser fit to structure 318, as secondary retention. The bracket 216 may define a first central aperture 454. The plate 324 may define a second central aperture 456 disposed within the first central aperture 454.

Figure 4:
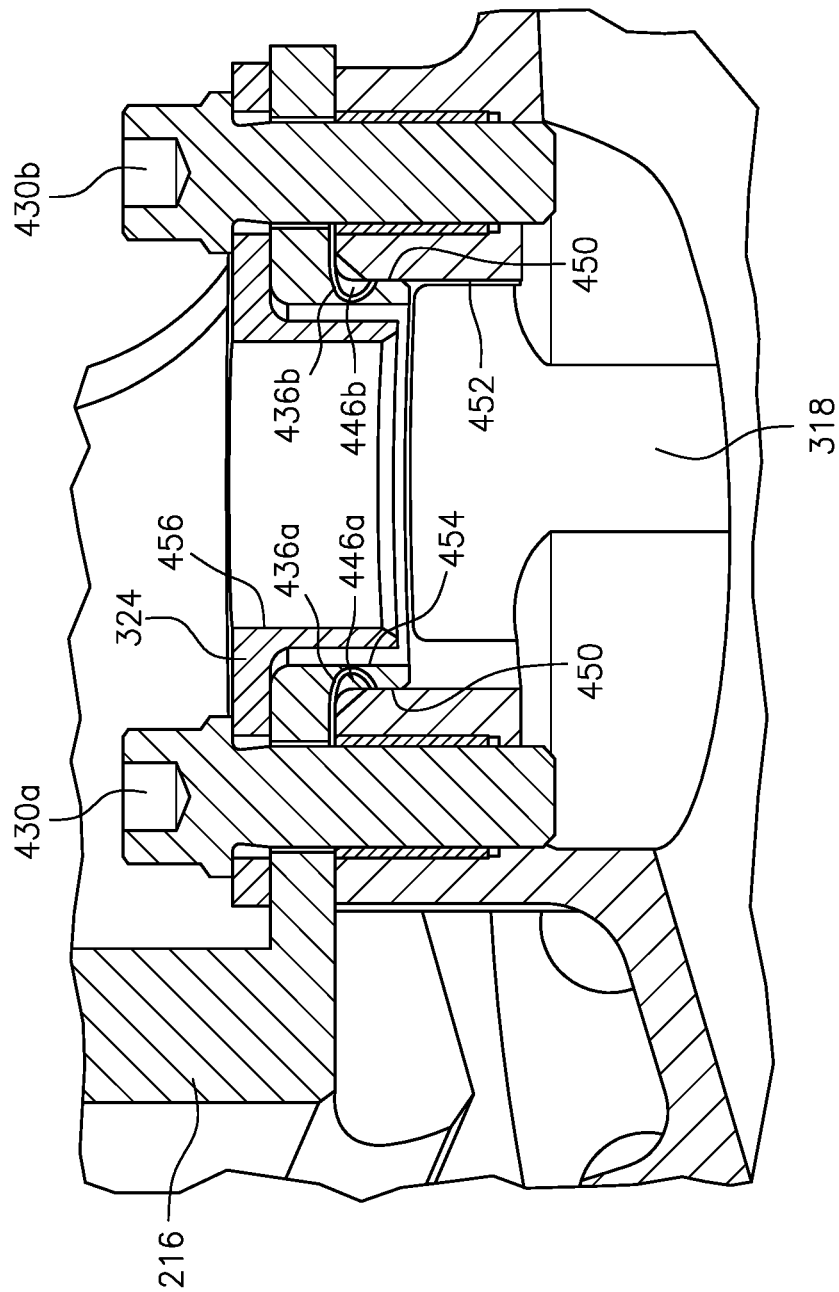
FIG. 4 illustrates a mounting of the bracket of FIG. 3 to a structure and one or more fuses incorporated in the bracket.

Referring to FIG. 4, one or more notches (e.g., notches 436a and 436b) may be formed in the bracket 216. As shown in FIG. 4, a notch 436a/436b may be formed in proximity to where the bracket 216 and the structure 318 interface to one another. The notches 436a and 436b may serve as a pilot for a fuse trigger as described further below.

The portion of the bracket 216 that is contained within a notch 436a/436b, denoted in FIG. 4 by reference characters 446a and 446b, may be sized to break at a predetermined percentage/threshold of a predicted load, such as for example at 75% of a nominal FBO load/event. The sizing of the notch 436a/436b (or, analogously, the bracket portion 446a/446b) may be determined based on analysis, simulation, testing, etc., as would be appreciated by one of skill in the art. The notch 436a/436b may be sized by determining the minimum cross sectional area of the bracket 216 at the location of the notch 436a/436b. This cross sectional area 'A', would be such that the UTS (Ultimate Tensile Strength of the Material)=P/A, where 'P' may be equal to a percentage (e.g., 75%) of a nominal FBO load/event. Alternatively, the minimum area 'A' may be determined using a Finite Element Analysis computer simulation.

When the fuse formed by the notch 436a/436b and the bracket portion 446a/446b is triggered/tripped, the bolts 430a and 430b may catch/retain the gearbox 204 (see FIGS. 2 and 4). In this respect, the bracket portions 446a and 446b may be viewed as sacrificial material of the bracket 216. Analysis has indicated that once the fuse formed by the notch 436a/436b and the portion 446a/446b is triggered, the likelihood of experiencing a secondary load/event of equal or greater magnitude is unlikely/remote, e.g., the probability is less than a threshold. As such, the remaining hardware (aside from the fuse) may be designed/manufactured to loads that are less than the load of the fuse-triggering event.

Technical effects and benefits of this disclosure include an ability to design/manufacture a gearbox system to a specification that is less than a worst-case loading event. In this respect, the gearbox system may incorporate light-weight materials in terms of its construction. A portion of a bracket may be allocated to serve as a sacrificial material in the event of a (first) load exceeding a threshold, such that the remainder of the gearbox system can be designed/manufactured to withstand one or more additional loads that are less than that threshold.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A mount system for an aircraft engine, comprising:
a gearbox;
a link coupled to the gearbox;
a bracket coupled to the link, the bracket including a mounting surface configured to define an interface with and mount the bracket to a structure of the aircraft engine; and
at least one bolt configured to mount the bracket to the structure,
wherein the bracket includes at least one notch formed in the mounting surface of the bracket to provide a pilot for a fuse trigger,
wherein a portion of the bracket contained within the at least one notch is configured to break away from the bracket when the mount system experiences a load that is less than a nominal load associated with a fan blade out event of the aircraft engine, and
wherein the mounting surface of the bracket is mounted within a corresponding aperture of the structure.

2. The mount system of claim 1, wherein the load corresponds to 75% of the nominal load.

3. The mount system of claim 1, wherein the gearbox is made of at least aluminum.

4. The mount system of claim 1, wherein the link is made of at least steel.

5. The mount system of claim 1, wherein the bracket is made of at least one of nickel or steel.

6. The mount system of claim 1,
wherein the structure is a stationary structure of the aircraft engine.

7. The mount system of claim 6, wherein the stationary structure is made of at least nickel.

8. The mount system of claim 6, wherein the stationary structure is one of a mid-turbine frame or an engine case.

9. The mount system of claim 1, wherein the bracket includes a first hole configured to seat a first bolt of the at least one bolt and a second hole configured to seat a second bolt of the at least one bolt.

10. The mount system of claim 9, wherein at least one of the first bolt or the second bolt is made of at least one of a nickel alloy, steel, or cobalt.

11. The mount system of claim 1, wherein at least one of the gearbox, the link, and a second portion of the bracket that is outside of the notch includes material to withstand a second load that is less than the nominal load.

12. The mount system of claim 1, wherein a size of the at least one notch is based on a minimum cross sectional area of the bracket at a location coinciding with the at least one notch and the load.

13. The mount system of claim 12, wherein the size of the at least one notch is proportional to the minimum cross sectional area divided by the load.

14. The mount system of claim 1, wherein the at least one bolt is configured to maintain the bracket mounted to the structure when the portion of the bracket contained within the at least one notch breaks away from the bracket.

15. The mount system of claim 1, wherein the bracket defines a first central aperture and a plate defines a second central aperture disposed within the first central aperture.

16. The mount system of claim 15, wherein the at least one notch is disposed between the at least one bolt and the first central aperture.

17. The mount system of claim 1, wherein a plate is coupled to the bracket by the at least one bolt.

* * * * *